Nov. 27, 1945. A. RICKENMANN 2,389,687
BEARING
Filed March 1, 1943

Inventor
ALFRED RICKENMANN

By Singer, Ehlert, Stern & Carlberg,
Attorneys

Patented Nov. 27, 1945

2,389,687

UNITED STATES PATENT OFFICE 2,389,687

BEARING

Alfred Rickenmann, Zurich, Switzerland

Application March 1, 1943, Serial No. 477,572
In Germany February 24, 1942

2 Claims. (Cl. 308—70)

The present invention relates to a new and improved bearing and more particularly to bearings for spindles and shafts running at very high speeds and subjected to axially and radially directed forces.

The main object of the invention is to provide bearings taking up and counterbalancing automatically the axially directed forces to which the running spindle is subjected.

I attain this and other objects by the provision of conical bearing surfaces on the spindle and the bushes and of thin oil layers between them which are set under pressure.

The characteristic features of my invention are fully disclosed in the following description and the accompanying drawing in illustration thereof.

Figure 1:
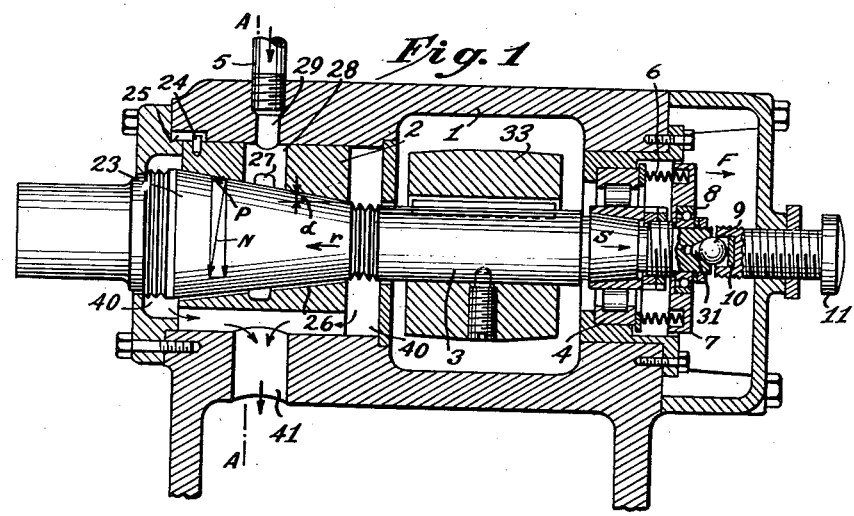
Fig. 1 is a longitudinal sectional view.
Figures 2, 4:
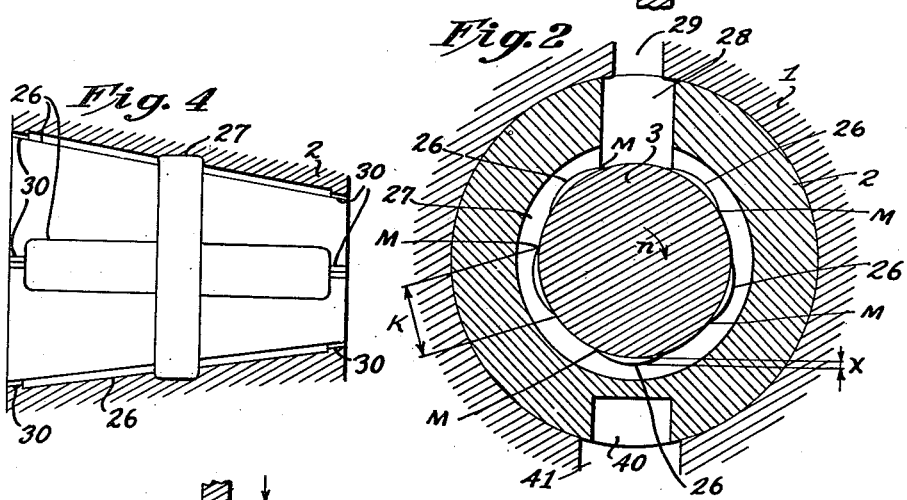
Fig. 2 is a cross section on line A—A of Fig. 1.
Fig. 4 is a view of part of the inner surface of a bush.

The bearing as illustrated in Figs. 1 and 2 is arranged in the bed or casing 1 of the machine. In a cylindrical bore of the bed 1 a bush 2 is arranged in which the spindle 3 carrying a pulley 33 runs. A conical portion 23 of the spindle 3 engages a conical bore of the bush 2. The free end of spindle 3 is supported by a roller bearing 4 of known construction. The bush 2 is secured in the bed 1 by a pin 24 engaging a groove 25 of the bed 1. The inner conical surface of the bush 2 is provided with five shallow grooves 26 of a breadth equal to K and a depth equal to X. The bush 2 is provided with a circular oil groove 27 and with a radial bore 28 communicating with a bore 29 of the bed 1. Oil is supplied under low pressure by a pump through a pipe 5 to said grooves 26 by the bores 28, 29 and circular groove 27, and will be equally distributed in the smaller grooves 26. When the spindle 3 is turned in the direction of arrow N, the oil having got access to the grooves is forced against the edges M of the grooves 26. The oil exerts a wedge-like action and tends to shift the spindle 3 in the direction of arrow r. The oil pressure N in the bush 2 and the angle of the conical portion 23 determine the pressure P in axial direction of the spindle 3. To retain the oil in the grooves 26 the latter are reduced in size at 30 near the two faces of the bush 2 (Fig. 4). The oil used flows off through the restricted duct of the grooves 26 through the conduits 40 and 41 to a collecting chamber. To maintain the pressure of the oil in the grooves 26, the force P is compensated by a number of springs 6 arranged between the roller bearing 4 and a disk 7. The latter runs on a ball bearing 8 attached to spindle 3 by means of nuts. The springs 6 press the spindle 3 in the direction shown by arrow S and keep the conical portion 23 of spindle 3 on to the bearing surface of bush 2. The forces P and S are equal. If by axial pressure the spindle 3 tends to move to the right, Fig. 1, the oil pressure N within the grooves 26 increases and counterbalances the force S. If on the contrary a pressure is applied on the spindle 3 in the direction to the left, Fig. 1, the oil pressure in the grooves drops at once and the springs 6 shift the spindle 3 to the right, Fig. 1. The layer of oil surrounding the conical portion 23 of spindle 3 varies in thickness with the viscosity of the oil used. By starting the rotation of spindle 3 the latter is pressed in the direction of arrow r, Fig. 1, more or less corresponding to the viscosity of the oil used and of the force F of the springs 6.

If the spindle 3 is at rest no oil pressure exists in the bush 2. By the pressure of the springs 6 the conical portion 23 of spindle 3 is pressed tightly into the bush 2 and the spindle 3 sticks fast. To counteract this tendency a conical recess 31 is formed in the face of the spindle 3. A ball 9 is placed in said recess 31 running on a steel disk 10 within a bore of a screw 11. The screw 11 is set to allow a turning of spindle 3 by hand. By turning the spindle 3 the same is moved axially until the forces P and F counterbalance each other. The axial displacement is very small and amounts only to a few one hundredths of a millimeter. This displacement is, however, great enough to bring the ball 9 out of action and to leave the spindle to the play of the forces P and F.

Figure 3:
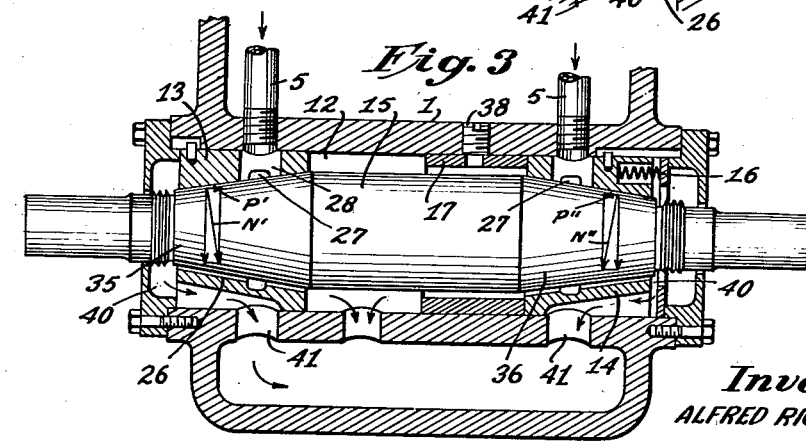
Fig. 3 is a longitudinal sectional view of a second form of bearing embodying my invention.

In the construction shown in Fig. 3 two bushes 13, 14 in the bed 1 and two conical portions 35 and 36 on the spindle 15 are arranged the conical portions being oppositely directed. In the bore 12 of the bed 1 in which the bushes 13, 14 are arranged, there is a ring 17 which is secured in its position by a screw 38. In the bush 13 an oil pressure N' in the grooves 26 is produced which tends to force the spindle 15 to the right. In the bush 14 an oil pressure N" and an axially directed force P" is produced which tends to displace the spindle 15 to the left. The bush 13 is rigidly connected to the bed 1 therefor the spindle 15 and all the parts connected therewith and the bush 14 are displaced to the right (Fig. 3) against the action of the springs 16. The forces $P^I$ and $P^{II}$ on the one side of the force of the springs 16 are balanced and the spindle 15 will run on the thin oil layers in the bushes 13 and 14 and of the grooves 26 provided in the bearing surfaces thereof. If the spindle 15 remains at rest, the springs 16 press the conical portions 35, 36 into the bushes 13, 14 with the effect that the spindle sticks fast. To obviate this drawback the ring 17 is arranged in such a manner that the bush 14 is arrested in a position in which the spindle may be freely turned by hand. Means to adjust the position of the ring 17 and therewith the play of the spindle in the bushes may be provided.

What I wish to secure by United States Letters Patent is:

1. In combination, a bearing for a spindle having two axially spaced conical portions with the smaller diameters directed toward the ends of said spindle, a housing having mounted therein two bushings each with a conical bore for rotatably supporting the conical portions of said spindle, the conical bearing faces of said bushings being provided with axially extending shallow oil grooves terminating in restricted ducts which retard the axial flow of oil from said grooves, means for supplying oil under pressure from the exterior of said housing to said oil grooves, one of said bushings being rigidly mounted in said housing, while the other bushing is axially slidable, but non-rotatable in said housing, an annular abutment within said housing, and a plurality of coil springs arranged between said abutment and said last named bushing whereby both bushings are biased in an axial direction toward seating engagement with their respective conical portion on the spindle, the oil pressure during the rotation of the spindle being such that the axially slidable bushing is maintained in a balanced condition by the two axially directed components of the oil pressure and the pressure of said coil springs, so as to insure the maintenance of a thin oil film between the conical bearing faces.

2. In combination, a bearing for a spindle having two axially spaced conical portions with the smaller diameters directed toward the ends of said spindle, a housing having mounted therein two bushings each with a conical bore for rotatably supporting the conical portions of said spindle, the conical bearing faces of said bushings being provided with axially extending shallow oil grooves terminating in restricted ducts which retard the axial flow of oil from said grooves, means for supplying oil under pressure from the exterior of said housing to said oil grooves, one of said bushings being rigidly mounted in said housing, while the other bushing is axially slidable, but non-rotatable in said housing, an annular abutment within said housing, a plurality of coil springs arranged between said abutment and said last named bushing whereby both bushings are biased in an axial direction toward seating engagement with their respective conical portion on the spindle, and an axially adjustable annular stop member in said housing and against which said axially slidable bushing is urged by said coil springs when the spindle is at rest, the oil pressure during the rotation of the spindle being such that the axially slidable bushing is maintained in a balanced condition by the two axially directed components of the oil pressure and the pressure of said coil springs, so as to insure the maintenance of a thin oil film between the conical bearing faces.

ALFRED RICKENMANN.